Feb. 11, 1930. T. E. ROSS 1,746,968
HAYING MACHINE
Filed Sept. 19, 1927 3 Sheets-Sheet 3
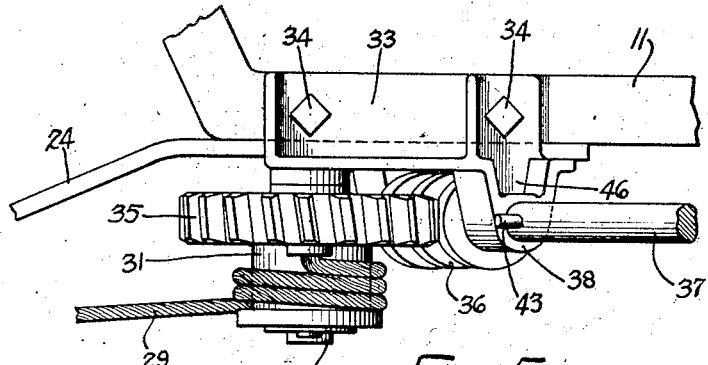
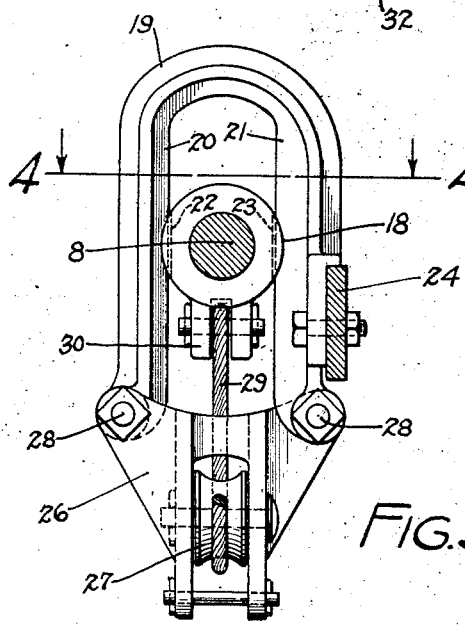
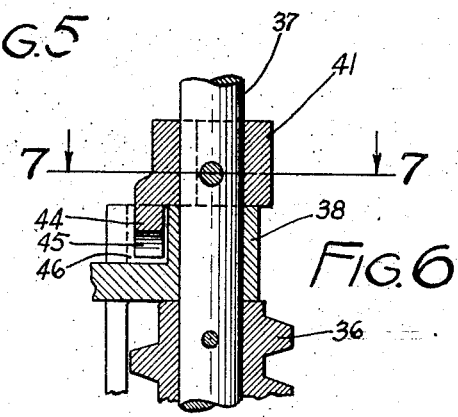
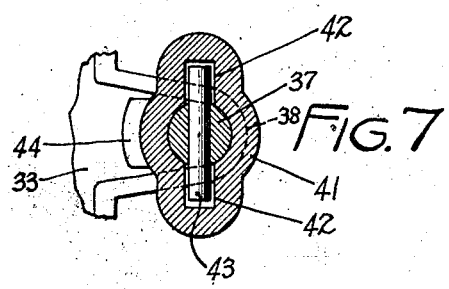
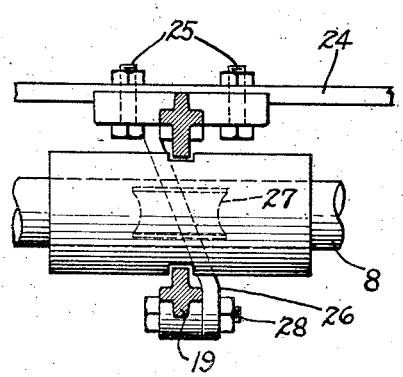
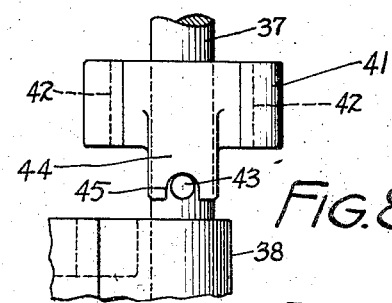
Inventor
THOMAS E. ROSS
By Paul, Paul Moore
ATTORNEYS Patented Feb. 11, 1930

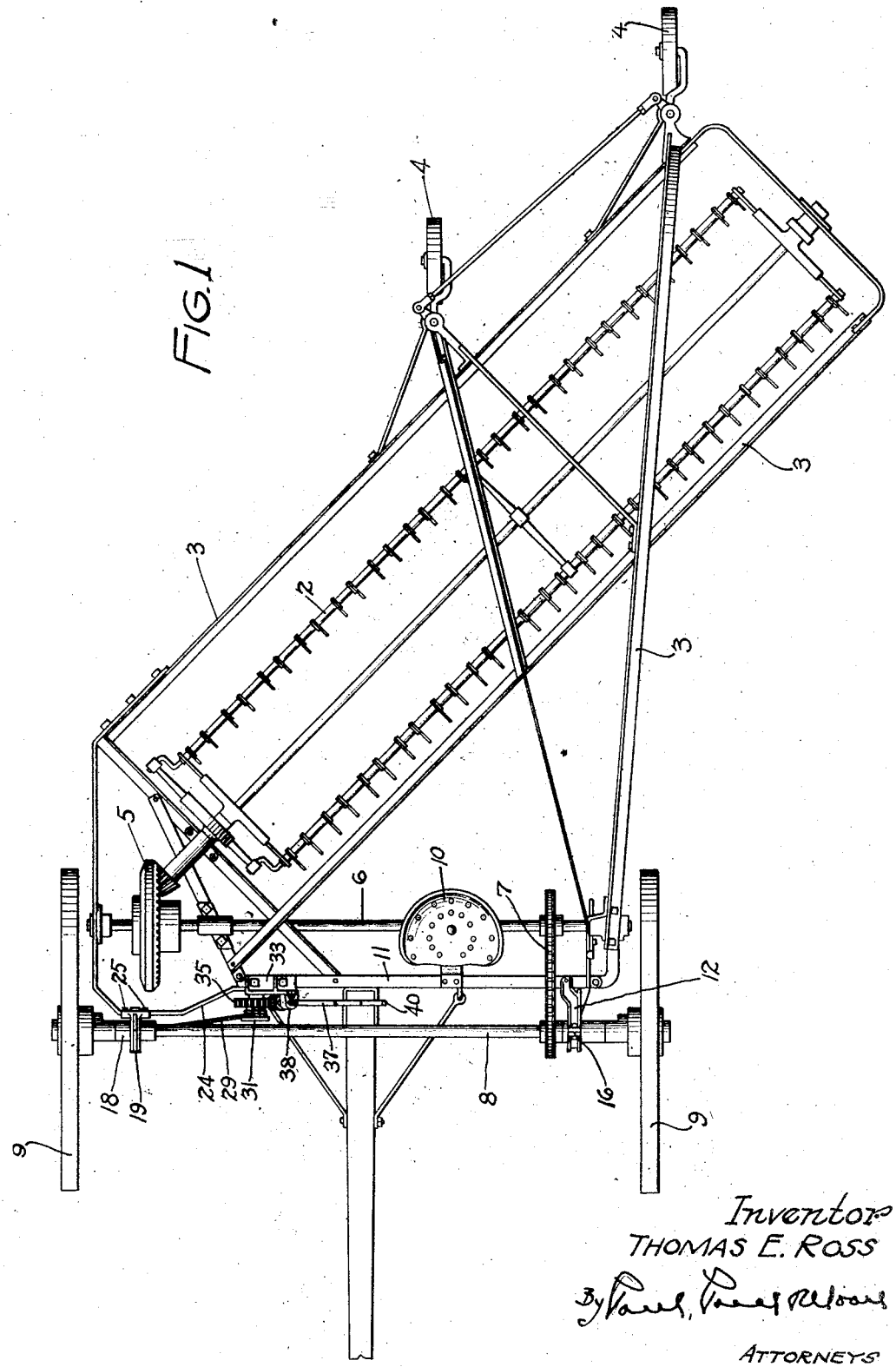

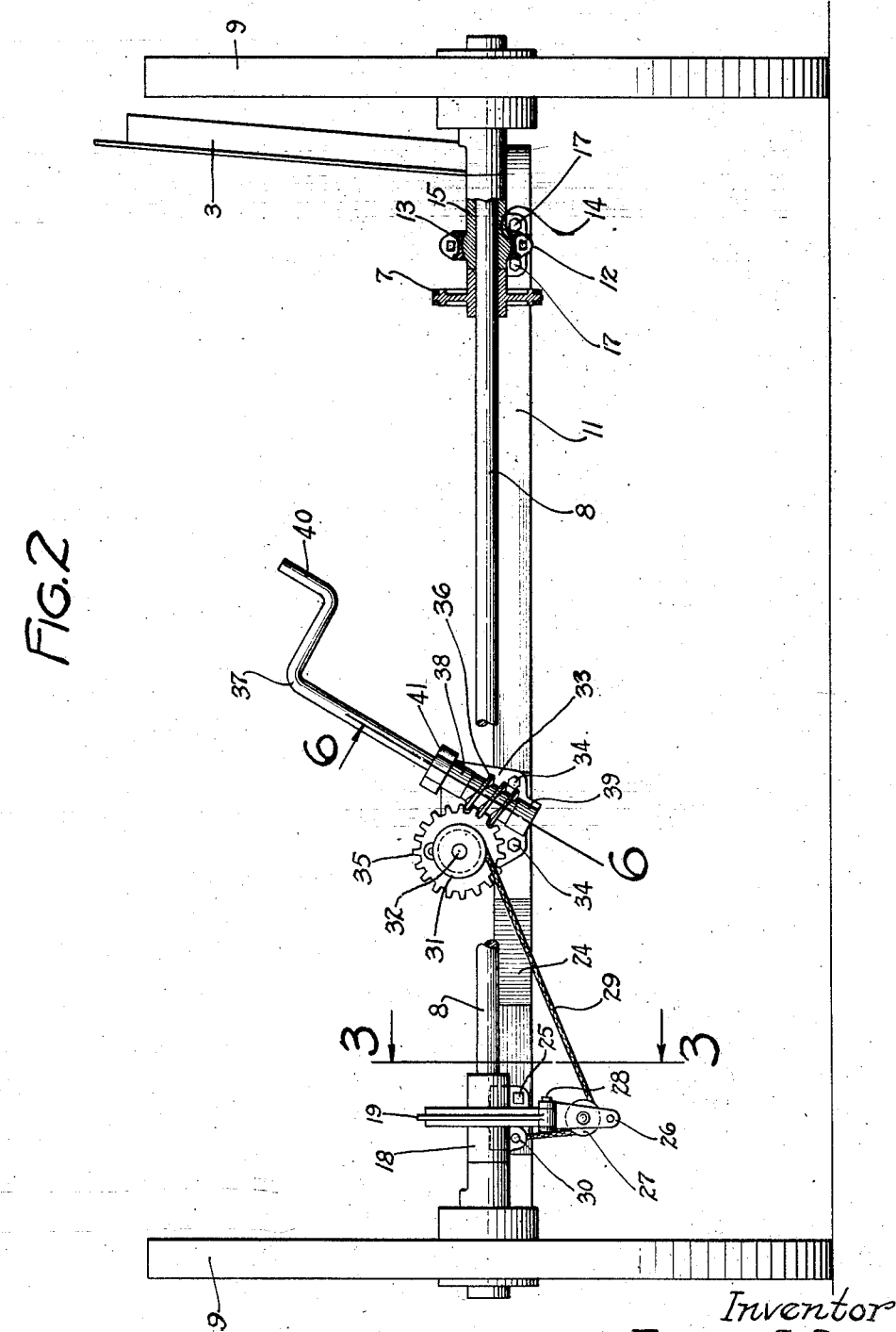

1,746,968

UNITED STATES PATENT OFFICE

THOMAS E. ROSS, OF STILLWATER, MINNESOTA, ASSIGNOR TO THE STATE OF MINNESOTA

HAYING MACHINE

Application filed September 19, 1927. Serial No. 220,600.

This invention relates to new and useful improvements in hayworking or handling machines, particularly side delivery rakes, comprising a frame having a cylinder mounted for rotative movement therein and adapted to pick up the hay and deliver it to one side of the rake in the form of a windrow.

An object of the invention is to provide means operable in connection with such a machine for vertically adjusting one side of the forward end of the frame with a minimum amount of effort from the driver's seat, to adjust the position of the cylinder with respect to the ground line.

A further object of the invention is to provide a side delivery rake having one side of the forward portion of its frame pivotally connected to a drive shaft, borne by suitable drive wheels, and the opposite side of the frame having a movable connection with the drive shaft whereby it may be vertically adjusted, easily and conveniently, to change the position of the cylinder with respect to the ground line.

A further object is to provide a machine of the above character comprising a frame, having a cylinder mounted therein and adapted for rotative movement, and a drive shaft being located forwardly of said frame and having one end thereof connected with one side of said frame by means of a universal connection, and the opposite side of said frame having a yoke secured thereto, adapted to slidably receive one of the drive shaft bearings, a winding mechanism being mounted upon said frame and having a connection with the lower portion of said yoke and with said drive shaft whereby, when the winding mechanism is operated, one side of said frame may be vertically adjusted with respect to said shaft.

Other objects of the invention reside in the general construction and the arrangement of the parts provided for vertically adjusting the forward end of the frame; in the ball-and-socket connection between one end of the drive shaft and the machine frame; in the yoke provided at the opposite end of the frame and adapted to receive one end of the drive shaft to vertically guide the frame with respect thereto; in the means provided for operatively connecting the drive shaft with the frame, to provide vertical adjustment of the latter with respect thereto; in the means provided for locking the winding mechanism in adjusted positions; and, in the simplicity in the adjusting mechanism which permits the latter to be manufactured at a minimum cost.

Other objects of the invention will appear from the following description and the accompanying drawings, and will be pointed out in the annexed claims.

In the drawings, there has been disclosed a structure designed to carry out the various objects of the invention, but it is to be understood that the invention is not confined to the exact features shown, as various changes may be made within the scope of the claims which follow.

In the accompanying drawings forming part of this specification,

Figure 1 is a plan view of a conventional type of hayrake, showing my invention embodied therein;

Figure 2 is an enlarged detailed sectional view showing a portion of the forward end of the machine and particularly the ball-and-socket connection between one side of the frame and the drive shaft;

Figure 3 is a detailed sectional view on the line 3—3 of Figure 2 showing the slidable connection between one end of the drive shaft and the machine frame;

Figure 4 is a sectional plan view on the line 4—4 of Figure 3;

Figure 5 is a detail plan view of the winding mechanism;

Figure 6 is a detailed sectional view on the line 6—6 of Figure 2, showing the means for locking the winding mechanism in adjusted positions;

Figure 7 is a sectional plan view on the line 7—7 of Figure 6; and

Figure 8 is a detailed view showing the locking mechanism in inoperative position.

In the selected embodiment of the invention herein shown, for purposes of disclosure, there is illustrated in Figure 1, a side delivery hayrake, of ordinary construction, comprising a cylinder 2 mounted for rotative movement in a suitable frame 3, the rear portion of which is supported upon suitable casters 4, as shown. The cylinder 2 is connected by a gear drive 5 to a driven shaft 6, having a chain-and-sprocket connection 7 with a drive shaft 8, carried by suitable drive wheels 9.

Hayrakes of the type above described are usually provided with means for vertically adjusting the cylinder 2 with respect to ground line, in order that it may be properly positioned to pick up the hay. The rear end portion of the cylinder 2 is usually adjusted by suitable means provided at the rear of the frame 3 and which is adapted to be operated from the driver's seat 10, by suitable means, not here shown. Difficulty has been experienced in providing means for conveniently adjusting the forward end of the cylinder, and the particular feature of this invention is to provide means which will enable the operator or driver to conveniently adjust the forward end of the cylinder, when desired, and without much effort.

To thus render the forward end of the cylinder conveniently adjustable, the drive shaft 8 is preferably spaced from the forward cross member 11 of the frame 3 and has one end connected therewith by means of a bracket 12, having a concaved seat 13 adapted to receive a spherical bearing surface 14, provided upon a bearing 15 supporting one end of the drive shaft 8. The outer end of the bracket 12 is preferably split as indicated at 16, to provide means for conveniently removing the bearing 15 therefrom. The bracket 12 is secured to the cross member 11 of the machine frame by such means as bolts 17. The concaved seat 13 and spherical surface 14 of the bearing 15 provide, in effect, a ball-and-socket joint, permitting universal movement of the opposite end of the shaft with respect to the machine frame 3.

A bearing 18 is provided at the opposite end of the shaft 8 and is mounted for vertical movement in a yoke or U-shaped member 19, preferably having inwardly extending ribs 20 and 21, slidably engaged respectively with grooves 22 and 23, provided in the periphery of the bearing 18. The yoke 19 is suitably secured to a strap-like frame member 24 by such means as bolts 25, shown in Figures 1 and 3. The strap-like frame member 24 has one end terminally secured to one end of the front cross member 11 of the frame, and its opposite end extends rearwardly, and is secured to the rear portion of the machine frame 3. A forked bracket 26, having an idler 27 rotatably mounted therein, is secured to the lower terminals of the yoke 19 by means of bolts 28, as shown in Figure 3.

A cable or suitable chain 29 has one end secured to the bearing 18 as indicated at 30, and passes downwardly over the idler 27 and has its opposite end wound about a drum 31 rotatably mounted upon a stub shaft 32, secured to a bracket 33, suitably secured to the front cross member 11 of the frame 3 by such means as bolts 34. A worm-gear 35 is preferably integrally formed with the drum 31, and is engaged with a worm 36 secured to one end of a crank shaft 37, operatively mounted in suitable bearings 38 and 39, provided in the bracket 33. The crank shaft 37 is provided with a crank 40 conveniently located adjacent to the driver's seat 10, as shown in Figure 1. When this crank is operated, the worm 36 will be actuated to rotate the winding drum 31, which will cause the cable 29 to be either wound or unwound, resulting in the forward right hand side of the machine frame being vertically adjusted with respect to the drive shaft 8, thereby causing the forward end of the cylinder 2 to be likewise adjusted with respect to the ground line.

Means are provided for locking the crank shaft 37 in its adjusted positions to prevent the frame 3 from relatively changing its position with respect to the drive shaft 8, when the machine is in operation. Such means are shown in Figures 6, 7, and 8, and consist of a member 41 slidably mounted upon the crank shaft 37 and having opposed inwardly facing grooves 42 therein, adapted to receive the opposed terminals of a pin 43, secured to the crank shaft 37 as shown. The member 41 is provided on one side with a downwardly extending lug 44, having a terminal notch 45 therein, adapted to engage one end of the pin 43, as shown in Figure 8, for the purpose of retaining the member 41 in inoperative position. The bearing 38 is provided on one side with a recess 46, adapted to receive the lug 44, when the latter is in the position shown in Figure 6. When thus positioned, the shaft 37 will be locked against rotation, as will readily be understood by reference to Figures 6 and 7. The locking member 41 has been omitted from Figures 1 and 5 of the drawings.

From the foregoing, therefore, it will readily be seen and understood that by the employment of this novel adjusting mechanism in combination with a machine of the class described, the forward end of the cylinder 2 may be easily and conveniently adjusted with respect to the ground surface by simply rotating the crank 40, which is, as before stated, conveniently located adjacent to the driver's seat. (See Figure 1.) The construction of the mechanism is also such that it will be positive in operation, thereby providing such a mechanism which is well adapted for use in connection with a side delivery hay rake or similar apparatus, for vertically adjusting the forward end of the rotating cylinder 2. By pivotally connecting one end of the shaft with the machine frame 3 by means of the bracket 12, and as a result of the chain drive 7 being located comparatively close to the bracket 12, the opposite end of the machine frame 3 may be readily and conveniently adjusted without interfering with the driving connection between the shafts 6 and 8.

I claim as my invention:

1. In a hayworking machine, the combination of a toothed cylinder, a supporting frame wherein said cylinder is diagonally arranged, a shaft having suitable supporting wheels, a yoke connected to said frame and having a vertical movement on said shaft, and means for vertically adjusting said frame and said yoke to change the position of said cylinder with respect to the ground surface.

2. In a hayworking machine, the combination of a toothed cylinder having a supporting frame therefor, a drive shaft located forwardly of said frame and supported upon suitable drive wheels, means pivotally connecting one side of said frame with said shaft, means connecting the opposite side of the frame with the shaft and permitting vertical adjustment of the frame with respect thereto, and a mechanism located between the connections of said frame with said shaft and adapted to actuate said adjusting means, whereby the cylinder may be adjusted with respect to the ground surface.

3. In a hayworking machine, the combination of a toothed cylinder, having a supporting frame therefor, a drive shaft located adjacent the forward end of said frame and having suitable ground-engaging drive wheels, means pivotally connecting one side of said frame with said shaft, a member secured to the opposite side of said frame and movably receiving said shaft and a winding mechanism having operative connections with said shaft and member whereby one side of the frame may be vertically adjusted with respect to said shaft for the purpose of adjusting the cylinder with respect to the ground surface.

4. In a hayworking machine, the combination of a frame having a cylinder rotatably mounted thereon, a drive shaft located adjacent to the forward end of the frame and having a pivotal connection with one side thereof, a yoke secured to the opposite side of said frame, said yoke being traversed by said shaft and permitting vertical movement of the shaft therein with respect to said frame, a drum mounted upon said frame and having a flexible connection with said shaft, and means for operating said drum to vertically adjust said frame with respect to said drive shaft.

5. In a hayworking machine, the combination of a frame having a cylinder rotatably mounted therein, a drive shaft at the forward end of the frame having a ball-and-socket connection with one side of said frame to permit the opposite end of the shaft to be moved with respect to said frame, a yoke secured to the opposite side of said frame and adapted to receive said shaft to provide a vertical guide therefor, an idler mounted beneath said yoke, a winding drum mounted upon said frame and a cable having one end secured to said winding drum and having its other end engaging said idler and secured to said drive shaft, and means for operating said winding drum whereby one side of said frame may be vertically adjusted with respect to said drive shaft, for the purpose of relatively adjusting the position of the cylinder with respect to the ground surface.

6. In a side delivery rake, a combination of a frame having a cylinder mounted for rotative movement therein, means for supporting the rear end of said frame, a drive shaft supported by suitable drive wheels, a bracket secured to one side of said frame and having a concaved seat therein, a member secured to said shaft and having a spherical bearing surface adapted to be received in the concaved seat, to provide a universal connection between one end of said shaft and said frame, a yoke secured to the opposite side of said frame and having inwardly extending vertical flanges, a bearing for said shaft mounted within said yoke and engaged with said vertical flanges to provide a vertical guide for the yoke, a winding drum mounted upon said frame, and having one end of a cable secured thereto, the opposite end of which is secured to the lower portion of said bearing, said cable also having a running connection with the lower portion of said yoke, and a worm-and-gear mechanism for operating said winding drum to vertically adjust one side of said frame with respect to said drive shaft.

7. In a side delivery rake, the combination of a frame having a cylinder mounted for rotative movement therein, a drive shaft pivotally connected to said frame and having supporting wheels, a bearing for said shaft at the opposite end thereof, a yoke secured to said frame and adapted to slidably receive said bearing, a bracket connecting together the legs of said yoke and having an idler mounted therein, a cable secured to said bearing and having a running connection with the lower portion of said idler, a winding mechanism mounted upon said frame and having the other end of said cable operatively connected therewith whereby, when said winding mechanism is operated, said frame will be vertically adjusted with respect to said shaft, to adjust the relative position of the cylinder with respect to the ground surface, and means for locking the winding mechanism in adjusted positions.

8. The combination with a wheeled frame, of a cylinder frame pivotally connected at one side with the wheeled frame, a cylinder diagonally mounted in the cylinder frame and adapted for rotation, and a winding mechanism operable from the driver's seat for raising or lowering said pivoted frame on the opposite side thereof from its pivotal connection with the wheeled frame, to change the position of the forward end of the cylinder with respect to the ground line.

9. In a side delivery rake, the combination of a frame, a rotatable cylinder therein, a drive shaft pivotally connected to said frame, a winding mechanism mounted on said frame, a cable connecting said winding mechanism to said drive shaft whereby, when said winding mechanism is operated, said frame will be vertically adjusted with respect to said shaft to change the vertical position of said cylinder with respect to the ground line.

10. In a side delivery rake, the combination of a frame having a cylinder mounted for rotation therein, a drive shaft pivotally connected to said frame and having supporting wheels, a driver's seat, a winding mechanism comprising a worm having an operating crank adjacent the driver's seat, a gear engaging said worm, a drum connected with said gear, and a cable connected to said drum and to said drive shaft whereby, when said operating crank is actuated, said frame will be vertically adjusted with respect to said shaft to adjust the forward end of the cylinder with respect to the ground line.

11. In a hayworking machine, the combination of a frame having a cylinder mounted for rotation therein, a driven shaft mounted in said frame and having a driving connection with said cylinder, a drive shaft operatively connected to said driven shaft and having suitable ground engaging wheels, means pivotally connecting one side of said frame with said drive shaft, and the opposite side of said frame having a slidable connection with said drive shaft whereby said side of the frame may be vertically adjusted with respect to said shaft to change the position of the cylinder with respect to the ground line.

12. In a hayworking machine, the combination of a frame having a cylinder diagonally mounted therein, a driven shaft mounted in said frame and having a driving connection with said cylinder for rotating the latter, a drive shaft mounted adjacent the forward end of said frame, means for pivotally connecting said frame with said drive shaft, and a winding mechanism mounted upon said frame and having a connection with said drive shaft whereby the frame may be vertically adjusted with respect to said drive shaft, to change the position of the cylinder with respect to the ground line.

In witness whereof, I have hereunto set my hand this 15th day of Sept., 1927.

THOMAS E. ROSS.